J. W. PEACOCK.
AUTOMATIC LOCKING DEVICE FOR MOTOR AND OTHER VEHICLES.
APPLICATION FILED MAR. 19, 1921.
1,431,417.
Patented Oct. 10, 1922.
2 SHEETS—SHEET 1.
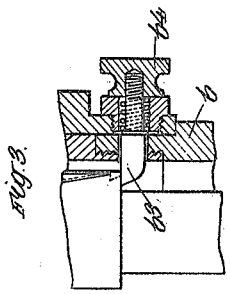
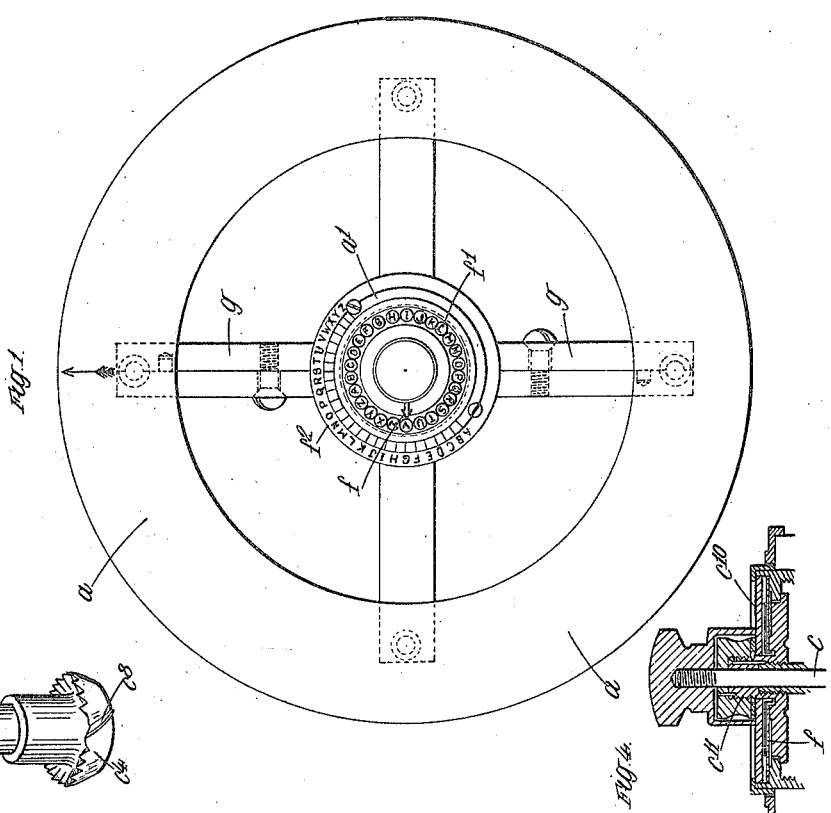
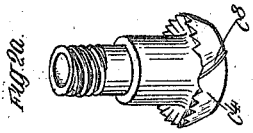
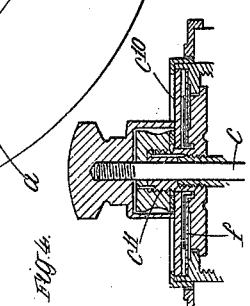

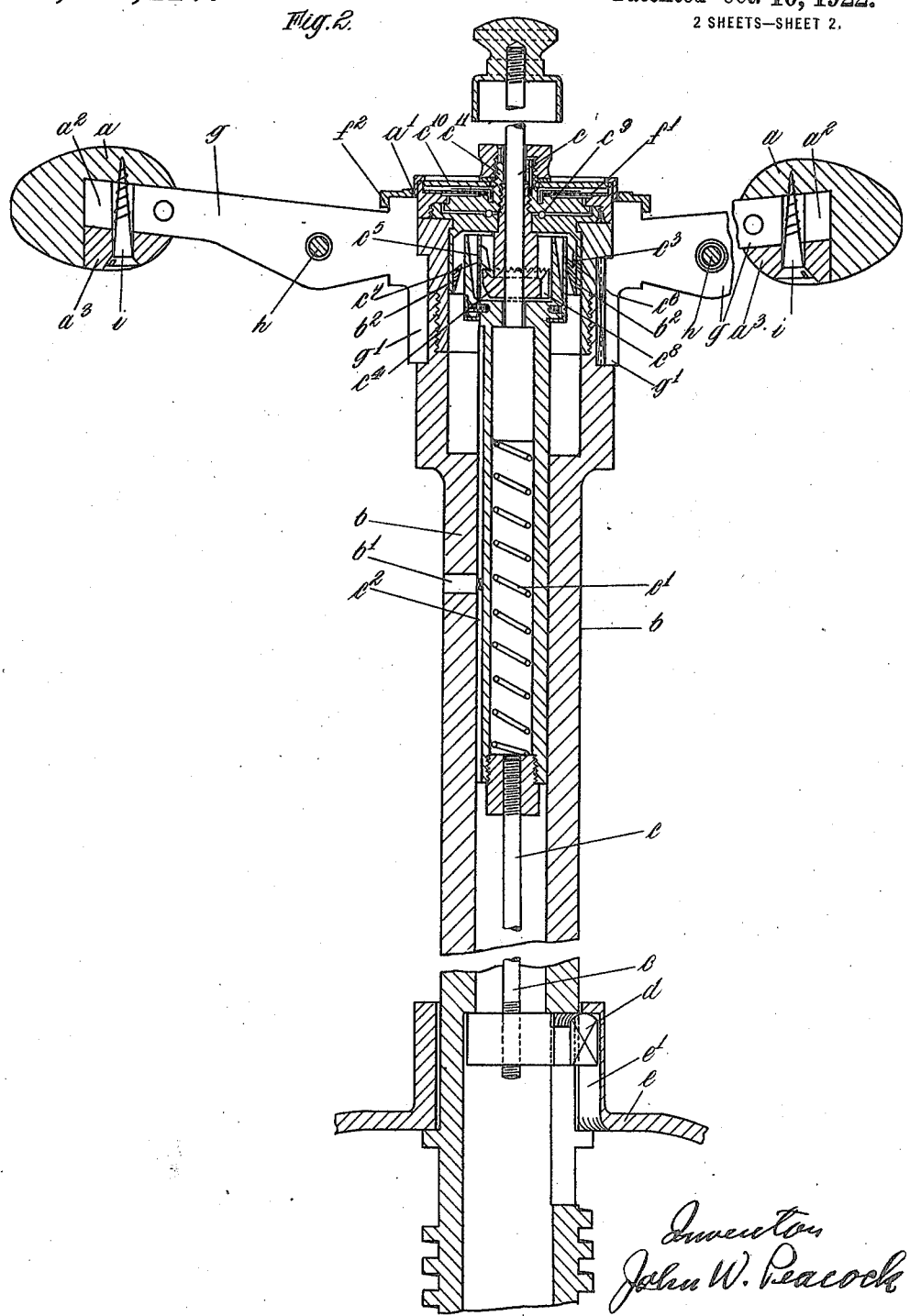

Patented Oct. 10, 1922.

1,431,417

UNITED STATES PATENT OFFICE.

JOHN WILLIAM PEACOCK, OF CHATHAM, ENGLAND.

AUTOMATIC LOCKING DEVICE FOR MOTOR AND OTHER VEHICLES.

Application filed March 19, 1921. Serial No. 453,731.

*To all whom it may concern:*

Be it known that I, JOHN WILLIAM PEACOCK, a subject of the King of Great Britain, residing at 120 Henry Street, Chatham, in the county of Kent, England, have invented certain new and useful Improvements in or Relating to Automatic Locking Devices for Motor and Other Vehicles, of which the following is a specification.

This invention relates to automatic locking devices for motor and other vehicles and has for its chief object to enable permutatation locking mechanism to be utilized for preventing unauthorized steering of the vehicle to which it is applied.

According to the invention the locking device comprises a central member adapted to pass longitudinally through and to bring into action permutation mechanism capable of being adjusted to a position whereby the member may be operated to unlock the steering mechanism. The permutation mechanism comprises means associated with said member which permit of the latter being moved freely in one direction whilst preventing its return until the said means have been adjusted or set by means of a code, the index or indicator for which may be arranged on or adjacent the hub of the hand steering wheel. The locking device is also so constructed and adapted to operate so as to prevent the code combination for operating the permutation mechanism being left in the unlocking position and to avoid the necessity of breaking the combination to frustrate unauthorized unlocking. The combination therefore is automatically broken in the act of unlocking, thus preventing any possibility of said combination being left in a position for unlocking which might happen if left for the driver to break or change the combination.

In order that the invention may be clearly understood and readily carried into effect the same will now be more fully described with the aid of the accompanying drawing in which:—

Figure 1 is a plan view of the hand steering wheel of a motor car with the invention applied.

Figure 2 is a vertical section of the wheel and a portion of the steering column showing the permutation mechanism.

Figure 2ª is a detail hereinafter referred to.

Figures 3 and 4 are detail views hereinafter referred to.

$a$ is the wheel and $b$ the column within which the permutation locking mechanism is mounted, whilst $c$ is the central member provided with an operating knob or handle which may be in the form of a cap. In Figure 2 the member $c$ is shown raised to bring into action appropriate devices connected thereto for locking the movement of the steering column $b$. Such devices comprise a pawl $d$ or its equivalent attached to the lower end of the member $c$ and adapted to be brought into engagement with a slot $e'$ in the central steering column bearing as shown in steering worm casing $e$, see Figure 2. The member $c$ is preferably of a telescopic character with a spring $c'$ interposed between the two parts, said spring being designed and arranged within the member $c$ in such a manner as to take up any force or shock on the member when the parts are in the locked position, whilst being sufficient to release the pawl when requiring to unlock the steering mechanism. The outer part of the member $c$ is provided with a slot or groove $c^2$ which receives a pin or projection $b'$ on the column $b$ to prevent rotation of the member $c$ whilst allowing for necessary longitudinal movement. The upper outer part of the member $c$ is of cup-shape fitted with a projection $c^3$ flexibly or resiliently mounted and co-operating with internal teeth $b^2$ which revolve in a collar made in two halves screwed in the top of column $b$, said projection $c^3$ serving when the member $c$ is raised to prevent its return except when the parts are in a predetermined position which may be obtained by the code or index on the hub of the wheel $a$. Teeth or serrations $c^4$ concentric to the member $c$ also co-operate with the internal projection $c^5$ on the cup-shaped portion of the member $c$ to prevent the lock being opened or the parts being returned to their normal position without previously setting the indicator according to the code necessary for adjusting the parts for unlocking. On said cup-shaped portion being raised to the position shown in Figure 2, a spring pawl $b^3$ projecting through the column or pillar $b$ is provided, see Figure 3, to take beneath the shoulder of the member $c$ so as to hold up the member $c$ with the projections $c^5$ and $c^3$ clear of teeth $b^2$ and $c^4$ to allow the combination to revolve and be set for unlocking as well as afford greater security against the projections $c^3$ and $c^5$ and teeth $b^2$ and $c^4$ being disengaged without proper adjustment as will hereinafter be explained. The indicator as shown in Figure 1 consists of a pointer $f$ mounted on an extension of the part carrying the teeth or serrations $c^4$ and rotatable over or adjacent an index $f'$ bearing letters or their equivalent any one of which may form a key letter of the code. A similar series of letters is arranged on the ring $f^2$ on the hub of the hand steering wheel, said ring $f^2$ being mounted adjacent a flange $a'$ of the hub carrying the internal teeth $b^2$. The flange $a'$ is furnished with a radiating line or lines, see Figure 1, which serve to locate any particular letter on the ring $f^2$ forming part of the code. Thus, assuming the steering column or pillar has been locked against rotation and the parts are adjusted according to the code necessary to bring the parts to a position whereby the member $c$ may be returned to its normal position the indicators on being set to the code will bring the teeth or serrations and their co-operating projections into such a position as will permit of the unrestricted movement of the member $c$. Such movement is provided for by cutting vertical grooves or slots in the parts carrying the teeth or serrations so that when such parts are adjusted by means of the index $f$ and flange $a'$ the movement of the member $c$ to its normal position may be brought about. Thus the ring of internal teeth $b^2$ is continuous except for a slot formed at one place into which slot the projection $c^3$ may move when the parts have been adjusted to the unlocking position. Similarly the part $c^4$ is provided with a slot $c^8$ into which the projection $c^5$ may move when the part $c^4$ has been rotated to the proper position. The projections $c^3$ and $c^5$ for co-operating with the teeth or serrations are mounted on spring blades $c^6$, $c^7$ respectively so that when the locking movement takes place the projections will pass the teeth or serrations at any position of the parts carrying the teeth or serrations and also the pawl $b^3$ Figure 3, thus enabling the mechanism to be locked without using the code or key and thereby ensuring of greater security or secrecy. The pawl $b^3$ is furnished with a milled head $b^4$ whereby it may be withdrawn after the parts have been adjusted for unlocking to enable the member $c$ to be depressed.

It will be understood from the above that in order to effect the unlocking the parts must be brought into such position that the projection $c^5$ will engage in the slot $c^8$ in the part $c^4$ and the projection $c^3$ will engage in the slot in the ring of teeth $b^2$. To effect this the member carrying the index $f'$ is rotated by means of the flange $a'$ to bring the slot in the ring $b^2$ beneath the projection $c^3$ and the member $c^4$ is rotated to bring the slot $c^8$ beneath the projection $c^5$. It is obvious therefore, that when the parts are being assembled the index $f'$ (which is printed upon a card or other ring shaped member adapted to be clamped, screwed or otherwise detachably secured to its support) may be arranged in such a position that when any desired letter thereon is opposite any desired letter on the index $f^2$ the ring $b^2$ is in correct position for the projection $c^5$ to engage in the slot therein. Similarly the angular position of the pointer $f$ may be so chosen that when it points to any desired letter on the index $f'$ the member $c^4$ will be adjusted so that the projection $c^3$ is immediately above the slot $c^8$. In this way any desired combination of three letters may be chosen to constitute the code.

For preventing the parts being left in a position corresponding to that of the code the slot $c^8$ formed in the part $c^4$ is curved and provided with a cam surface (see Figure $2^a$) so that when after the part $c^4$ has been rotated to bring the slot into such position that the projection $c^5$ can engage therein, upon the member $c$ being depressed the said projection $c^5$ will ride on the cam surface of the slots $c^8$ and cause the part carrying the teeth $c^4$ to be rotated on ball bearings $c^9$ and the combination of the code broken so that there can be no possibility of the mechanism being left with the indicator set to the code required to unlock the mechanism after the steering has been automatically locked by simply raising the member $c$. The cap or knob of the member $c$ when in the unlocked position serves to enclose and protect the part carrying the pointer $f$, see Figure 4. When requiring to change the code this may be effected by the owner of the vehicle adjusting the position of the pointer $f$. To carry out such change the parts must be brought first to the locked position, the pawl $b^3$ withdrawn to permit the projections $c^3$ $c^5$ to engage the teeth $b^2$ $c^4$ so as to prevent movement of the revolving parts, the caps and the glass covers $c^{10}$ removed when the pointer $f$ may be adjusted to any other desirable position. When desired the pointer may be provided with a projection adapted to engage a groove or grooves cut in the boss $c''$ around which the indicator is secured. Similarly the index $f'$ may be provided with projections adapted to engage corresponding slots or openings cut in the part supporting said index and over which the glass cover is mounted.

To enable the parts to be assembled or made integral with the hand steering wheels the spokes $g$ of the latter may be divided as shown in Figure 2, and formed in one with half collars $g'$ adapted to be secured in position around the steering column by screws $h$, the rim of the wheel being recessed at $a^2$ and attached to the spokes by screws $i$ and fillets $a^3$. An arrow on the rim of the steering wheel $a$ denotes the top and locking position.

Whilst the invention is shown applied to the hand steering wheel of a motor car it is equally applicable to other vehicles such as cycles, in which connection the lock mechanism may be mounted in a tubular fitting which may constitute the handle bar stem, and a pawl or lever at the lower end connected to the member $c$ may pass through a clearance provided in the fork stem and engage in a recess or slot in the head tube when requiring to lock or prevent the steering of the cycle.

What I claim and desire to secure by Letters Patent of the United States is:—

1. A locking device for vehicles comprising a longitudinally movable member, a locking pawl carried thereby, projections on said member, serrations concentric with said member adapted to co-operate with said projections to prevent the said member being moved to unlocking position, slots in said serrations, an indicator adapted to be set to a code combination, and means whereby when said indicator is set to a predetermined code combination the aforesaid slots are brought into registry with the projections to enable the aforesaid member to be moved to unlocking position.

2. A locking device for vehicles comprising a longitudinally movable member, a locking pawl carried thereby, projections on said member, teeth concentric with said member adapted to co-operate with said projections to prevent the said member being moved to unlocking position, slots in said teeth, an indicator adapted to be set to a code combination, means whereby when said indicator is set to a predetermined code combination the aforesaid slots are brought into registry with the projections to enable the aforesaid member to be moved to unlocking position, and means for automatically breaking the code combination when the said member is moved to unlocking position.

3. A locking device for vehicles comprising a longitudinally movable member, a locking pawl carried thereby, projections on said member, teeth concentric with said member adapted to co-operate with said projections to prevent the said member being moved to unlocking position, slots in said teeth, an indicator adapted to be set to a code combination, means whereby when said indicator is set to a predetermined code combination the aforesaid slots are brought into registry with the projections to enable the aforesaid member to be moved to unlocking position, and means for maintaining said teeth out of engagement with the said projections while the code combination is being set to unlocking position.

4. A locking device for the steering mechanism of vehicles comprising a member longitudinally movable within the hollow steering column or post of the vehicle means for lifting said member to lock the said column or post against movement, projections carried by said member, a series of teeth adapted when the member is in locking position to engage said projections to prevent the downward movement of the said member, slots in said series of teeth and means for bringing said slots into registry with said projections to enable the said member to move downwardly into locking position.

5. A locking device for the steering mechanism of vehicles comprising a member longitudinally movable within the hollow steering column or post of the vehicle, means for lifting said member to lock the said column or post against movement, inwardly and outwardly directed resiliently mounted projections carried by said member, two series of teeth adapted when the member is in locking position to engage the projections, slots in said series of teeth and means for bringing the said slots into registry with said projections to enable the said member to move downwardly into unlocking position.

6. A locking device for the steering mechanism of vehicles comprising a member longitudinally movable within the hollow steering column or post of the vehicles means for lifting said member to lock the said column or post against movement, projections carried by said member, a series of teeth adapted when the member is in locking position to engage said projections to prevent the downward movement of the said member, slots in said series of teeth, means for bringing said slots into registry with said projections to enable the said member to move downwardly into unlocking position and means for indicating when the said slots are in registry with the said projections.

7. In a locking device for the steering mechanism of vehicles, a member longitudinally movable within the hollow steering column or post of the vehicle, projections carried by the said member, movable toothed members, an index associated with one of said movable toothed members, a pointer associated with the other of said movable toothed members, a fixed index, and means whereby the said toothed members may be moved into positions predetermined by the angular position of the said pointer and the said movable index to permit the downward movement of the longitudinally movable member into locking position.

8. In a locking device for the steering mechanism of vehicles a member longitudinally movable within the hollow steering column or post of the vehicle, projections carried by the said member, movable toothed members, an index associated with one of said movable toothed members, a pointer associated with the other said movable toothed members, a fixed index and means whereby the downward movement of the said longitudinally movable member breaks the code combination on said indexes indicating unlocking position.

9. A locking device for the steering mechanism of vehicles comprising a member longitudinally movable within the hollow steering column or post of the vehicle and carrying a pawl adapted in one position to lock the said column or post against movement, a cup shaped member on the upper part of said longitudinally movable member, said cup shaped member having internal and external projections, a ring of upwardly projecting teeth surrounding said cup shaped member, a series of teeth arranged within said cup shaped member, a slot in the ring and series of teeth respectively and means for rotating the said ring and said series of teeth to bring the slots therein into registry with the aforesaid internal and external projections.

10. A locking device for the steering mechanism of vehicles comprising a telescopic member arranged within the hollow steering column or post of the vehicle, a locking pawl carried by said member extending through and movable in a slot in the said column or post, means for raising said member, a cup shaped member on the upper part of said telescopic member, internal and external projections carried by said cup shaped member, a ring of upwardly projecting teeth surrounding said cup shaped member, a slot in the ring and series of teeth respectively and means for rotating the said ring and said series of teeth to bring the slot into registry with the aforesaid internal and external projections for the purpose specified.

11. Permutation locking mechanism for the steering mechanism of vehicles comprising an annular toothed member carrying an index, a second toothed member carrying a pointer, a member longitudinally movable in the hollow steering column or post of the vehicle, a locking pawl in said member, means for raising said member, projections on said member adapted when the member is in raised position to engage with the teeth of the said second toothed member to prevent the downward movement of the said longitudinally movable member, and means for rotating the said toothed members to bring them into positions according to the relative positions of the said pointer and index determined by a code to permit the aforesaid projections to pass into slots in the toothed members and cause the unlocking of the steering mechanism.

12. In a locking device for the steering mechanism of vehicles, a member longitudinally movable within the hollow steering column or post of the vehicle, projections carried by the said member, movable toothed members, an index associated with one of said movable toothed members, a pointer associated with the other of said movable toothed members, a fixed index, means whereby the said toothed members may be moved into positions predetermined by the angular position of the said pointer and the said movable index to permit the downward movement of the longitudinally movable member into unlocking position, and an index and pointer associated respectively with the ring and series of teeth to indicate according to a predetermined code when the said projections and slots are in registry.

13. Permutation locking mechanism for the steering mechanism of vehicles comprising an annular toothed member carrying an index, a second toothed member carrying a pointer, a member longitudinally movable in the hollow steering column or post of the vehicle, a locking pawl on said member, means for raising said member, projections on said member adapted when the member is in raised position to engage with the teeth of the said two toothed members to prevent the downward movement of the said longitudinally movable member, means for rotating the said toothed members to bring them into positions according to the relative positions of the said pointer and index determined by a code to permit the aforesaid projections to pass into slots in the toothed members and cause the unlocking of the steering mechanism, and means whereby the movement of the said longitudinally movable member automatically breaks the code combination.

JOHN WILLIAM PEACOCK.